United States Patent
Poel et al.

(10) Patent No.: US 9,540,155 B2
(45) Date of Patent: Jan. 10, 2017

(54) POLYMER COMPOUND FOR SEALS FOR USE WITH FAT-CONTAINING FILLING MATERIALS

(75) Inventors: Christiane Poel, Bremen (DE); Georg Schlenk, Wildeshausen (DE); Rüdiger Wittenberg, Bremen (DE)

(73) Assignee: ACTEGA DS GMBH, Bremen (DE)

( * ) Notice: Subject to any disclaimer, the term of this patent is extended or adjusted under 35 U.S.C. 154(b) by 1270 days.

(21) Appl. No.: 13/511,094

(22) PCT Filed: Nov. 20, 2009

(86) PCT No.: PCT/EP2009/008273
§ 371 (c)(1),
(2), (4) Date: Sep. 4, 2012

(87) PCT Pub. No.: WO2011/060803
PCT Pub. Date: May 26, 2011

(65) Prior Publication Data
US 2013/0206770 A1    Aug. 15, 2013

(51) Int. Cl.
*B65D 53/04* (2006.01)
*B21D 51/46* (2006.01)
*C08L 23/08* (2006.01)
*C08L 53/00* (2006.01)
*B65D 53/00* (2006.01)

(52) U.S. Cl.
CPC ............ *B65D 53/04* (2013.01); *B21D 51/46* (2013.01); *B65D 53/00* (2013.01); *C08L 23/0815* (2013.01); *C08L 53/00* (2013.01); *C08L 2205/02* (2013.01); *C08L 2314/06* (2013.01)

(58) Field of Classification Search
CPC .................. B65D 53/04; B21D 51/46
See application file for complete search history.

(56) References Cited

U.S. PATENT DOCUMENTS

| 5,060,818 A | 10/1991 | Doi et al. |
| 5,673,004 A | 9/1997 | Park |
| 6,235,822 B1 | 5/2001 | Whetten et al. |

FOREIGN PATENT DOCUMENTS

| EP | 0 250 057 A2 | 6/1987 | |
| EP | 0 503 124 B1 | 6/1998 | |
| EP | 0 714 427 B1 | 6/1999 | |
| EP | 1 816 086 A1 * | 8/2007 | ............ C08L 53/00 |
| EP | 1 894 974 A1 * | 3/2008 | ............ C08L 53/02 |
| EP | 2 058 379 A1 | 5/2009 | |

OTHER PUBLICATIONS

International Search Report and Written Opinion for International Application No. PCT/EP2009/008273, European Patent Office, Rijswijk, Netherlands, mailed on Mar. 12, 2010.
International Preliminary Report on Patentability for International Application No. PCT/EP2009/008273, European Patent Office, Rijswijk, Netherlands, mailed on Jun. 12, 2012.

\* cited by examiner

*Primary Examiner* — Robert Harlan
(74) *Attorney, Agent, or Firm* — Sterne, Kessler, Goldstein & Fox PLLC

(57) ABSTRACT

The invention relates to a polymer compound for a sealing insert for a container closure, in particular for fat-containing filling materials, which has a composition such that the migration of constituents of the compound into the filling material is reduced, characterized in that the Shore A hardness of the polymer compound is between 45 and 95 and in the compressive deformation test analogous to ASTM D395-97 Method B at 70 DEG C the polymer compound exhibits a compression set of 30-90%.

24 Claims, No Drawings

POLYMER COMPOUND FOR SEALS FOR USE WITH FAT-CONTAINING FILLING MATERIALS

The invention relates to a polymer compound for a sealing liner for a container closure (made of metal or plastic) of containers used for contained materials, in particular fat-containing filling goods, which is composed in such a way that the migration of constituents of the compound into the fat-containing filling goods is reduced.

Larger container closures of the type considered here are particular lug caps, which are typically used for sealing of screw-top jars for food stuff or beverages. These food stuffs are often fat-containing products, such as convenience or prepared food, sauces, delicacies, fish in oil, anti-pasti, spice pastes and the like, whose content of fats and oils increases the risk that fat-soluble components of the packing material dissolve in the food stuff.

These requirements are particularly relevant for infant food, which is typically sold in glass jars with press-on Twist-Off® caps.

While the industry has used PVC-free compounds for sealing inserts or liners for crown caps or screw caps for narrow neck bottles for a long time, PVC-containing compounds are still used for screw caps and the like, which serve as container closures for containers with a larger inner diameter. Usually, such PVC-containing compounds are provided and applied at room temperature as fluid, plasticizer-containing systems.

Based on soft PVC technology, low-migration sealing compounds, which frequently use polyadipates, can be formulated. Due to their molecular weight they are less prone to migration. To our knowledge, however, a toxicological assessment of degradation products particular of those formed in the stomach has not been performed. The prescribed test method to assess the migration, EN 1186, suggests that migration is complete after 10 days storage at 40° C. The analytical practice has shown that this is not the case for plasticized PVC. Even when meeting the test specifications, caps exceed the migration limits after a few months. According to the invention, preferably PVC-free compounds are used. In the product according to the invention, this effect is circumvented by avoiding liquid ingredients.

However, it is undesirable to use PVC-containing compounds in packaging materials. In the conventional incineration of household waste, halogen-containing plastics generate acidic gases whose escape into the atmosphere is harmful. In addition, even small amounts of PVC impede the mechanical recycling of plastic waste. Moreover, such PVC-based sealing elements require the use of plasticizers, which are also critical for reasons of unacceptable alteration of food stuffs. Furthermore, in recent years a public debate on additives in PVC seals and their decomposition products developed. Examples therefore are 2-ethylhexanoic acid which is often generated from stabilizers, and semicarbazide that can arise from exothermic blowing agents such as azodicarbonamide. These substances were also found in official controls and there were complaints about their presence.

The migration of constituents of the packaging (to which, in case, the sealing liner of the container closure belongs) into the food is not only generally undesirable but also strictly regulated by law. Examples of such regulations are the EC Directives 1935/2004, 2023/2006, 2002/72/EC, 372/2007 and 2007/19/EC. Presently, the upper limit for migrating components is 60 ppm.

The measurement of the extent of migration which may be observed is done by methods as defined in DIN EN 1186 in particular. Such methods are also used in the context of the present invention.

It is not a trivial problem, to provide container closures of the type considered here with PVC-free sealing inserts, if these closures have to follow the regulations concerning the possible migration of their chemical constituents. In addition, the sealing function must be guaranteed under filling conditions.

For small container closures, sealing inserts (such as those described in EP 0 503 124) with barrier effects against certain contaminants have already been used.

However, the demands on the sealing materials in container closures for container openings with larger inner diameter are more challenging (e.g. because of the relatively large amounts of material in the seal). For such applications, it is particularly important to combine a sufficient fluidity of the polymer material during the manufacture of the sealing element, with sufficient sealing in the closed situation; this also includes the nowadays required impermeability to the penetration or the escape of gases. In case this is combined with an excess pressure valve effect, which prevents bursting of the container due to warming or other reasons, in which excess pressure is developed in the container. In addition, especially for the typical uses of containers with larger opening diameters (such as preserves) it is required that the sealing element is applicable under conditions of sterilization.

Container closures described in EP 0 503 124, which are typically intended for bottling of beer, soft drinks, juice drinks and the like in conventional narrow-necked bottles, have to withstand the therein described treatments such as pasteurization and hot-filling. In pasteurization and hot-filling, temperatures of up to 100° C. are used. The polymer materials according to the invention are tailored to be suitable for pasteurization or hot-filling and additionally maintain their sealing effect to the necessary extent in contact with fat-containing filling goods.

In meeting all these characteristics, the seals must also comply with the above mentioned requirements for the migration of chemical constituents.

To facilitate the processing of conventional compounds, extenders and/or plasticizers are usually added. In particular, components that are liquid at ambient temperatures such as extender oils/or plasticizers (preferably white oil) are used.

It has been shown that such compounds, if necessary after modification of the recipe, can be processed into sealing inserts for larger opening diameters. However, container closures with such sealing inserts do not always comply with legal regulations in respect of migration of chemical constituents.

There is thus a need for container closures, which have a polymer-based sealing insert, preferably not based on PVC, and which can be used for containers with larger opening diameters (above 2 cm inner diameter). Such closures should be pasteurizable and should not show any troublesome migration of chemical constituents of the sealing material. Additionally, the closures should be used for fat-containing filling materials.

It is one important objective of the invention to provide a sealing insert for the manufacture of such container closures, which allows equipping of the container closure with a polymer-based sealing element which does not contain PVC, and which comply with legal regulations concerning the migration of packaging components.

Another objective of the invention is to define corresponding container closures.

Furthermore, the invention relates to the use of particularly suitable polymer compounds for the production of such container closures.

To achieve the object, a sealing insert for container closures according to the invention is made from a compound having the features as defined in claim 1.

Generally, container closures according to the invention can be used for closing of openings with an inner diameter above 3 cm. This corresponds to an inner diameter that is larger than that of the conventional beverage bottles which can be closed with crown corks, screw caps and the like in a known manner (e.g. as described in EP-B1 0 503 124).

The invention is particularly suitable for the production of relatively large container closures, i.e. for container openings with an inner diameter of more than 2.5 cm up to those in which the inner diameter of the opening to be closed is larger than 4 cm.

Such container closures can be used as screw caps for bottles such as juice or milk bottles, for preserve jars, jam jars and the like, in particular for screw-off jars for fat-containing (especially oil-containing) food stuffs such as sauces, spice pastes and the like.

The container closures according to the invention are suitable for the packaging of food stuffs for infants and young children in suitable glasses (e.g. in the form of so-called press-on Twist-Off® caps).

In the container closure according to the invention, the sealing element is formed as a liner on the inner surface of the container closure, similarly as it is the case for the common crown corks and screw caps.

In the known bottle closures (crown corks and the like), the sealing element is mostly formed as a circular disk on the inside of the container closure. However, for larger container closures according to the invention it may be advantageous to form instead only a ring of polymer material which in the closed state of the container contacts the container wall in the opening area. Such ring-shaped sealing elements are known, but as described they are presently only made of PVC-containing and plasticized materials, although there are also PU materials from which the above-mentioned sealing elements are produced.

The procedure described in U.S. Pat. No. 5,763,004 (which is incorporated into the present description by reference) can be used for this purpose.

Generally, in the manufacturing method according to the invention, the container closure blank is assumed to be made of metal, preferably first pretreated on its inner side with a suitable primer. In case of a container closure made of plastic this pretreatment is not necessary.

Usually, the composition of the primer is based on epoxyphenol. Particularly suitable for this purpose is a varnishing system from ACTEGA Rhenania (base coat TPE 279 with adhesive coat TPE 1500), on which the most preferred compounds according to the invention adhere particularly well. However, the priming coat can also be based on polyesters.

Alternatively, a suitable primer coating can be deposited by lamination, lining or possibly also by co-extrusion.

On the so pretreated blank, the polymer material which should form the seal is applied to the inner surface after the material was thermally made flowable. Particularly suitable therefore is extrusion, in which the sealing compound is presented in a temperature range between 100° C. and 260° C.

The extrusion can take place in the center of the inner surface of the blank, if the sealing insert should be circular disc-shaped. The dosage of the polymer material for the extrusion takes place via stripping of a defined amount of the polymer compound from a nozzle.

Subsequently, the disc-shaped seal element is formed by the extruded material which is still capable of flowing by an appropriate stamping process (analog to the known SACMI method).

In another embodiment, the sealing element can be formed outside of the container closure or container closure blank by stamping of a suitable polymeric material, whereby subsequently the sealing insert is introduced into the closure or blank. This method is also known as "outshell-moulding" (SACMI), for small container closures.

More specifically, the present invention relates generally to container closures (made of metal or plastic) for containers used for beverage and food stuffs, which should be protected from migration of packing components according to legal regulations. These are for example fat- and oil-containing food stuffs, such as prepared or convenience food, especially oily sauces and spice pastes, for example, curry paste. In the oil and fat components of these food stuffs, extenders such as white oil, but also constituents of plasticizers are particularly easy dissolved.

In order to ensure a tight closure of the container, the container closures according to the invention possess the above-mentioned requirements concerning their processibility on the one hand and their sealing properties on the other hand. Additionally, they meet the legal requirements concerning the migration of packaging components.

To achieve this, the material of the sealing insert is chosen such that the migration of constituents of the material into fat-containing filling material is largely prevented, so that in accordance with current European standards not more than 60 ppm, preferably significantly less than 60 ppm of migrating components, are detectable in the filling material.

As a main component, the material of the sealing insert comprises a polymeric component, preferably comprising two different polymers. The term "copolymer" as used in the present specification can have the same meaning as the term "interpolymer", as also described in patent specification U.S. Pat. No. 6,235,822. The properties of this main polymeric component can be suitably modified by the admixture of other components, such as other polymers. Thus it has surprisingly been found that an olefin block copolymer as described in EP-B 1 0 714 427 is useful as a main component for achieving the objective, especially when mixed with a second polymer. As the second polymer, certain random copolymers are suitable, optionally together with, or replaced by, HDPE, (co)-PP or other types of polymers of this kind.

In a preferred embodiment of the present invention, the material of the sealing insert has only small amounts of, or more preferable no, constituents which are liquid at application temperature. The application temperature is usually equal to the ambient temperature, i.e. in the range of usual temperatures outdoors or in heated rooms.

Therefore according to the invention, only small quantities or preferably no fluid extenders, such as white oil in particular, are added to the material of the sealing insert.

In a preferred embodiment the material contains not more than 10%, preferably not more than 7%, more preferably not more than 4% and even more preferably not more than 1% of lubricants, which may pass into fat-containing filling materials in limited amounts in a migration test at 40° C. for 10 days.

It is presently most preferred that the material contains (within the analytical limits given at the date of filing the application) absolutely no ingredients which are liquid at application temperature.

Furthermore, it is preferred that the material of the sealing insert contains no plasticizers.

Compounds for such sealing inserts without extenders are potentially difficult to process, especially if the diameter of the container closure exceeds 3 cm and if the material for instance as described in EP 0 503 124 is based on styrene-containing block copolymers with elastomeric chain segments. Therefore, according to the invention, materials are preferably used which do not contain these polymers.

It is preferred that the material from which the sealing insert is formed neither contains said fluid extenders or plasticizers, nor styrene-containing block copolymers with elastomeric chain segments.

Instead, it is preferred that the polymer material forming the main component of the sealing insert is based on certain polyalkylenes, which can be processed without extenders and the like to form seal inserts for container closures with diameters of more than 3 cm.

t has been found that a block copolymer which on the one hand comprises polyethylene units and on the other hand is composed of an alkene monomer, selected from propene, butene, hexene and, in particular, octene, is particularly well suited for this purpose.

Such copolymers can be produced with desired physical properties by using metallocene catalysts.

Suitable polymers are described in EP-B10 714 427. There it is stated that these polymers as such can be processed to form sealing inserts, but no additives should be added. However, the invention is based inter alia on the finding that these polymers can be processed to form improved sealing inserts, when additives according to the invention are added. The problem of migration of material components in fat-containing filling materials is not addressed there.

On the other hand, particularly suitable as a component of such compounds is a random copolymer, that is formed by a linear or branched interpolymer of ethylene on the one hand and at least one $C_3$-$C_{20}$ alpha-olefin on the other hand. Suitable random polymers are described for example in U.S. Pat. No. 6,235,822.

According to the invention, it has been found that other formulation variations are possible, wherein the block copolymer is present in the range of 20-100%, the random copolymer is present in the range of 0-80%, and as additional ingredients, other polyolefins, in particular, styrene-ethylene/butylene-styrene (SEBS), HDPE or co-PP with up to 25% are present.

According to the invention, the formula can comprise an ethylene-octene block copolymer, such as e.g. Infuse D9007 in the range of 37%-41%, an ethylene-octene random copolymer, such as e.g. Engage 8402 in the range of 58%-62%, an antioxidant, such as e.g. Irganox 1010 in the range 0.1%-0.3%, a stabilizer such as e.g. Irgafos 168 in the range of 0.0%-0.2%, a lubricant such as e.g. erucic acid amide in the range 0.2%-0.4%, and a lubricant such as oleamide in the range 0.2%-0.4%.

An exemplary formulation for use for hot-filling and pasteurization comprises:
Ethylene-octene block copolymer: 39.1%
Ethylene-octene random copolymer: 60%
Antioxidant: 0.2%
Stabiliser: 0.1%
Lubricant: 0.6%

According to the invention, said material generally has a Shore A hardness of 45 to 95. In particular according to the formulation, it has a Shore A hardness of about 85 and a Shore D hardness of about 25. The compression set of the polymer compound (determined analogous to compressive deformation test ASTM D395-97 Method B) is between 50 and 80%.

The polymeric materials according to the invention can resist hot-filling at up to 100° C. for up to 60 min, starting from a hot-filling of at least 60° C. at a maximum of 10 min and a minimum of 1 min. The hot-filling starting from 60° C. can be accomplished in 60 min to up to 100° C. in increments of 5° C.

The apparent shear viscosity at 185° C. is 100 $s^{-1}$<100 Pa·s and at 500 $s^{-1}$ is <50 Pa·s. This was determined using a twin-bore capillary rheometer Porpoise P9 with a nozzle diameter of 0.5 mm.

Optionally, pigments (preferably inorganic pigments, to prevent any pigment migration) can be added to the formulations of the compounds. It has also been shown that other additives such as waxes, silicones and in particular blowing agents may be added to the polymer compounds, for example to improve processing and performance characteristics.

Furthermore, the polymer compounds show a compression set of 30-90% at 70° C. in the compressive deformation test analogous to ASTM D 395-97, Method B. For sterilized products, the compression set has higher values, up to 90%. For pasteurizable (but not sterilizable) products, the compression set may be at somewhat lower values, up to about 80%. For compounds with thermoplastic vulcanizates (TPV materials), the lower limit of the compression set may by down to 30%; for other materials the range of the compression set is preferably at least 50%.

These materials can be processed to form large sealing elements for correspondingly large container closures with, for example, the described methods of our parallel international patent application (entitled "Method of producing a vessel closure"). Thus, it is for the first time possible to provide, for example, lug caps with diameters greater than 60 mm with a sealing insert which meets the regulations of the EC Directives 1935/2004 2023/2006, 2002/72/EC, 372/2007 and 2007/19/EC.

In regard to these legal requirements, migration tests have to be carried out for container closures according to the invention as described in DIN EN 1186. There is no representation of this measurement method in the context of the present application but these tests are incorporated by reference to DIN EN 1186 in the disclosure of the present application.

The use of said polymer material according to the invention not only allows that such produced sealing insert can be produced unproblematically and with the sealing properties as described above. Moreover, such container closures are pasteurizable, and they meet the above European legal regulations concerning the migration of constituents of the polymer material in the drink or food stuff, especially fat-containing filling materials, which are enclosed in containers sealed according to the invention.

In this regard the regulations of said European law directives, particularly in connection with the test criteria of DIN EN 1186 are appropriate selection criteria for the polymer material that can be determined from a plurality of conceivable compounds by avoidance of components that are liquid at the application temperature and subsequent testing.

The invention claimed is:

1. A method for producing press on and twist off caps for containers having an opening with an inner diameter above 2 cm that is to be closed by the container closure comprising a polymer-based sealing element which is arranged in the container closure in such a manner that it sealingly contacts the opening of the container in the closed state, in which method a polymer compound is made sufficiently flowable by heating and applied to the container closure in the region of the sealing element to be produced and brought mechanically into the desired shape which is maintained after it has cooled,
   wherein the Shore A hardness of the polymer compound is in the range of 40 to 90 and
   the polymer compound shows a compression set between 30% and 70% in the compressive deformation test according to ASTM after 22 hours at 70° C. and a compression of 25%,
   the polymer compound is PVC-free and
   wherein the polymer compound comprises a block copolymer which on the one hand comprises polyethylene units and on the other hand is built up from an alkene monomer, selected from the group consisting of propene, butene, hexene and octene, in the range of 20% to less than 100%;
   a random copolymer, that is composed of a linear or branched interpolymer of ethylene on the one hand and at least one $C_3$-$C_{20}$ alpha-olefin on the other hand, in the range of less than 80%; and
   other polyolefins up to 25%.

2. The method according to claim 1, wherein the Shore A hardness of the polymer compound is in the range of 60 to 75.

3. The method according to claim 1, wherein the polymer compound comprises not more than 10% of components that are liquid at the application temperature.

4. The method according to claim 1, wherein the copolymer is produced by using metallocene catalysts.

5. The method according to claim 1, wherein the polymer compound is composed such that the sealing insert is useable under conditions of pasteurization.

6. The method according to claim 1, wherein the polymer compound is composed such that the sealing insert is useable under conditions of sterilization.

7. The method according to claim 1, wherein the container closure has a gas barrier effect and/or an excess pressure valve effect in the closed state.

8. The method according to claim 1, wherein the container closure provides vacuum retention in the closed state.

9. The method according to claim 1, wherein the polymer material is provided as a granulate and is heated by an extruder.

10. The method according to claim 1, wherein the flowable polymer material is applied by a nozzle onto the inner side of the container closure.

11. The method according claim 10, wherein the applied polymer material is shaped by a stamp or the like.

12. The method according to claim 1, wherein the container closure corresponds to an inner diameter of the container opening of more than 2.5 cm.

13. A method for producing container closures for containers having an opening with an inner diameter above 2 cm that is to be closed by the container closure comprising a polymer-based sealing element which is arranged in the container closure in such a manner that it sealingly contacts the opening of the container in the closed state, in which method a polymer compound is made sufficiently flowable by heating and applied to the container closure in the region of the sealing element to be produced and brought mechanically into the desired shape which is maintained after it has cooled down,
   wherein the Shore A hardness of the polymer compound is in the range of 40 to 90 and
   the polymer compound shows a compression set between 30% and 70% in the compressive deformation test according to ASTM after 22 hours at 70° C. and a compression of 25%,
   the polymer compound is PVC-free, and
   wherein the polymer compound comprises a block copolymer which on the one hand comprises polyethylene units and on the other hand is composed of an alkene monomer, selected from the group consisting of propene, butene, hexene and octane, in the range of 20% to less than 100%;
   a random copolymer, that is composed of a linear or branched interpolymer of ethylene on the one hand and at least one $C_3$-$C_{20}$ alpha-olefin on the other hand, in the range of less than 80%;
   other polyolefins up to 25%.

14. The method according to claim 13, wherein the polymer compound comprises not more than 10% of components that are liquid at the application temperature.

15. The method according to claim 13, wherein the copolymer is produced by using metallocene catalysts.

16. The method according to claim 13, wherein the Shore A hardness of the polymer compound is in the range of 60 to 75.

17. The method according to claim 13, wherein the polymer compound is composed such that the sealing insert is useable under conditions of pasteurization.

18. The method according to claim 13, wherein the polymer compound is composed such that the sealing insert is useable under conditions of sterilization.

19. The method according to claim 13, wherein the container closure has a gas barrier effect and/or an excess pressure valve effect in the closed state.

20. The method according to claim 13, wherein the container closure provides vacuum retention in the closed state.

21. The method according to claim 13, wherein the polymer material is provided as a granulate and is heated by an extruder.

22. The method according to claim 19, wherein the flowable polymer material is applied by a nozzle onto the inner side of the container closure.

23. The method according to claim 1, wherein the other olefins comprise at least one of HDPE, co-PP, or styrene-ethylene/butylene-styrene (SEBS).

24. The method according to claim 13, wherein the other olefins comprise at least one of HDPE, co-PP, or styrene-ethylene/butylene-styrene (SEBS).

* * * * *